Aug. 27, 1940.   C. L. ARNOLD   2,212,534
HEATING PLANT
Filed Feb. 1, 1938    2 Sheets-Sheet 1

Clarence L. Arnold INVENTOR
BY Victor J. Evans & Co.
ATTORNEYS

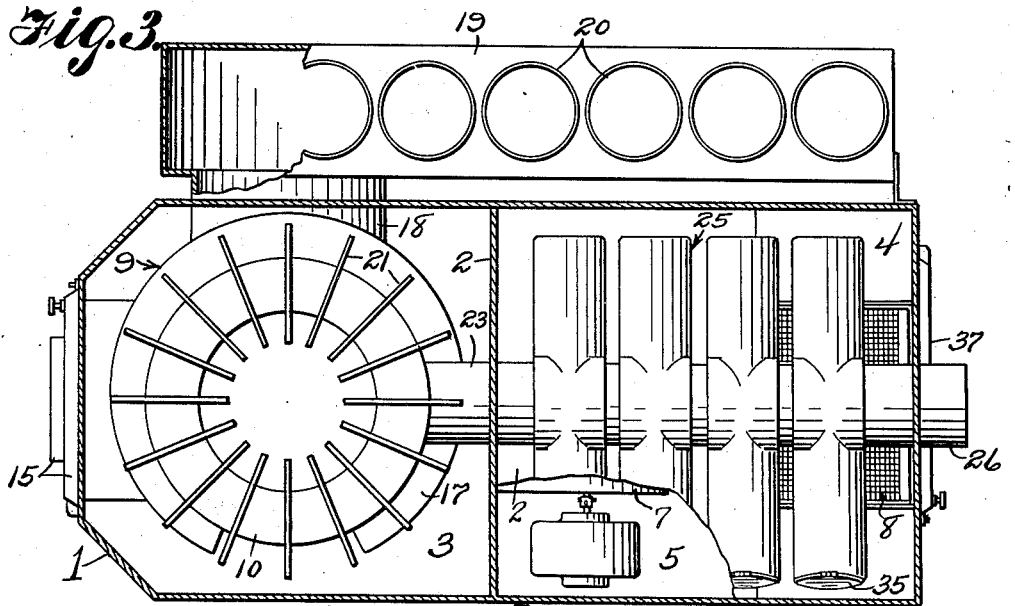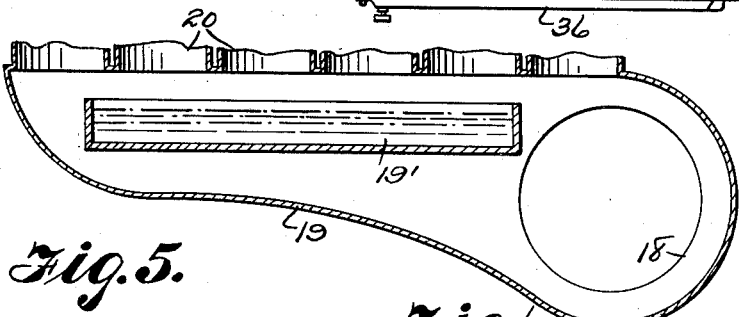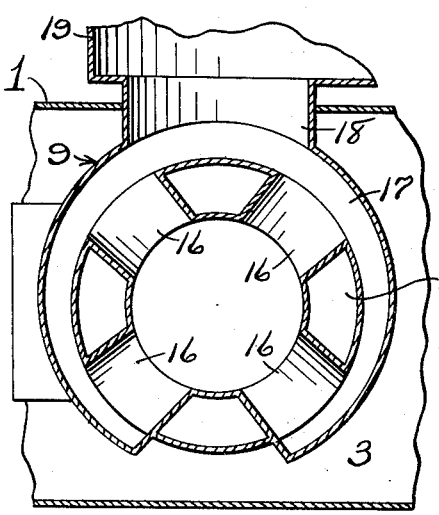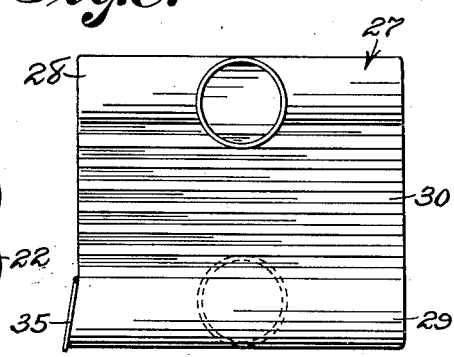

Patented Aug. 27, 1940

2,212,534

UNITED STATES PATENT OFFICE 2,212,534

HEATING PLANT

Clarence L. Arnold, Leavenworth, Kans., assignor of one-half to Wilbert G. Schreiber, Leavenworth, Kans.

Application February 1, 1938, Serial No. 188,172

2 Claims. (Cl. 126—106)

This invention relates to heating plants for domestic and similar uses and has for the primary object the provision of a device of this character which is of the hot air type, designed for any kind of fuel and embodies a construction wherein the incoming air will be preheated by heat derived from the products of combustion and then filtered and delivered into the main heating chamber for further heating and in a downward direction whereby the air will absorb a maximum amount of heat with a minimum amount of fuel consumed.

Another object of this invention is the provision of an improved heat collecting ring to receive the heated air from the main heating chamber and deliver said heated air to a combined humidifier and distributor chamber to which the various heat conveying pipes are connected so that each of said pipes will receive a proportional amount of heated air properly moistened and free of foreign matter.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a heating plant constructed in accordance with my invention.

Figure 3 is a sectional view taken on line 3—3 of Figure 2.

Figure 4 is a sectional view taken on line 4—4 of Figure 1.

Figure 5 is a sectional view taken on line 5—5 of Figure 2.

Figure 6 is a side elevation illustrating one of the units of the heat trap.

Figure 1:
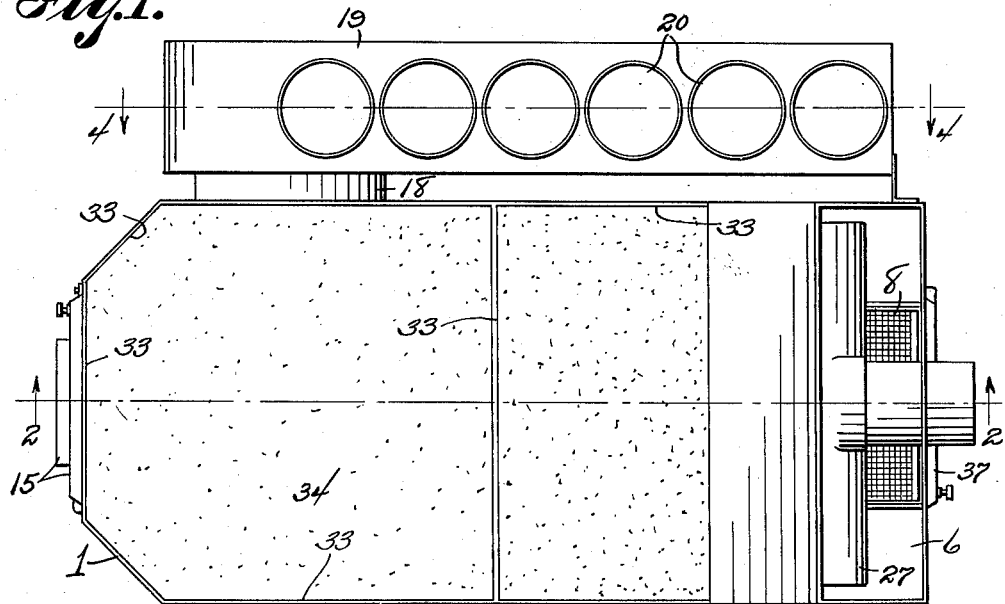
Figure 2:
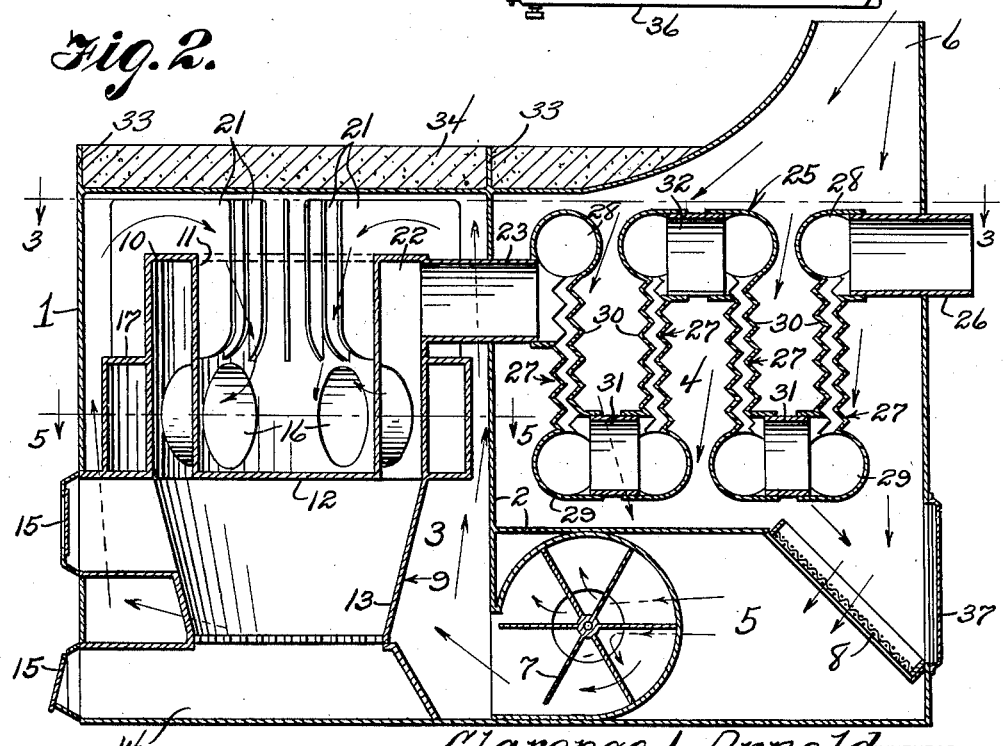
Figure 2 is a sectional view taken on line 2—2 of Figure 1.

Referring in detail to the drawings, the numeral 1 indicates a furnace casing divided by partitions 2 to provide compartments 3, 4 and 5. The compartment 4 is open to the atmosphere through a neck 6. The compartments 3 and 4 are placed in communication with each other through the compartment 5 in which is located a fan 7. The communication between the compartment 4 and the compartment 5 is by way of a filtering medium 8 so that air passing from the chamber 4 into the chamber 5 under the influence of the fan will have foreign matter removed therefrom. The fan drives the air into the chamber 3.

A heating device 9 capable of employing any type of fuel is located in the compartment 3 and consists of a double walled, annularly chambered, main heating drum 10 open at its upper end, as indicated at 11, and closed at its lower end by a wall 12 positioned over a firebox 13 which includes an ashpit 14. The firebox and ashpit open outwardly through the front of the casing and are normally closed by doors 15. The vertical walls of the drum 10 adjacent the bottom wall 12 are provided with outlet ports 16 over which is positioned a heat collecting ring 17 having an outlet 18 extending through a side wall of the casing 1 and connected to a combined humidifier and hot air distributing chamber 19 to which a plurality of heat conveying pipes may be connected. The ports for establishing connection between the pipes and the combined humidifier and hot air chamber are indicated by the numeral 20. The collecting ring 17 is of substantially annular formation and its internal dimension is gradually enlarged and thereby increases its area and capacity in the direction of the outlet 18. The air discharged by the fan 7 into the compartment 3 passes upwardly in the same and downwardly through the drum and outwardly therefrom by way of the ports 16 into the collecting ring 17. The drum 10 is heated to a high degree of temperature and the air passing downwardly therethrough will be highly heated and to bring about a complete distribution of the air downwardly against all walls of the drum the latter is equipped with a plurality of relatively spaced fins 21, portions of which are arranged exteriorly of the drum and, as shown, terminate in direct contact with the top wall of the heat collecting ring 17, while portions thereof extend downwardly in the drum and terminate short of the ports 16. Between the inner and outer walls of the drum 10 and communicating with the firebox is the annular flue chamber 22 permitting the products of combustion to pass upwardly about the vertical walls of the chamber and pass therefrom by way of a pipe 23. The pipe 23 extends into the chamber 4 and is connected with a heat trap 25 to which the smoke pipe 26 is connected. The smoke pipe is adapted to be connected as usual to the chimney. The heat trap 25 consists of a plurality of units 27 each including upper and lower elongated cylindrical chambers 28 and 29 and a vertically arranged corrugated connecting flue 30 establishing communication between the upper and lower chambers 28 and 29. The units 27 are spaced from each other to permit a free circulation of air about each unit and the units are connected to each other by comparatively short pipes 31 and 32. The pipes 31 connect the chambers 29 of pairs of units while said pairs of units have the chambers 28 thereof connected by the short pipes 32. The upper chamber 28 of one of the end units is connected to the pipe 23 and the other end unit has its upper chamber 28 connected to the smoke pipe 26 so that the products of combustion received in the heat trap from the pipe 23 will be caused to travel in a zigzag path before reaching the smoke pipe 26. A heat trap 25 of the character described will present a comparatively large area for the incoming air to contact externally and to be heated by the products of combustion passing through the trap and will absorb a maximum amount of heat so as to be preheated before entering the drum 10. Thus it will be seen that the incoming air will have its temperature substantially raised prior to reaching the heating device 9 by employing the products of combustion from said heating device as a heating medium so that when the air passes in and through the drum it will not have a great tendency to chill the drum, permitting a smaller volume of heat from the firebox to raise the air to a maximum degree of temperature; consequently the device is thereby economically operated from a fuel standpoint with maximum efficiency in heating rooms of a dwelling or like place to a desired temperature.
It is preferable that the casing 1 be provided with upstanding flanges 33 for supporting on the major portion of the top of the casing insulating material 34 and especially over the chamber 3 in which the heating device is located to eliminate fire hazards by the device.

Any suitable type of container may be arranged in the combined humidifier and heated air distributing chamber 19 so as to contain liquid for moistening the heated air. The humidifier is conventionally shown at 19' in Figure 4. If desired, the chambers 29 of the units 27 of the heat trap may have cleanout doors 35 in the ends thereof. Also the casing 1 may have a cleanout door 36 to give access to the cleanout doors 35 of the chambers 29. The fan 7 may be power driven in any well known manner. A cleanout door 37 may be provided in the casing 1 adjacent the filter 8 to permit cleaning or removal thereof when desired.

What is claimed is:

1. As a sub-combination in a heating unit of the character herein described, a furnace unit comprising a lower fire box portion, an upper cylindrical double-walled portion, the walls being spaced to provide an annular chamber closed at its top but open at its bottom to communication with the fire box, the central chamber within the inner wall of the drum being closed at its bottom but open at its top, said annular chamber having a flue outlet, a hollow heat-collecting ring surrounding the lower portion of the drum and being communicably connected with the central chamber of the drum through radial tubular passageways and provided with an outlet for the heated air, and radial fin elements attached with heat conductivity to the upper portion of the drum, said fin elements projecting upwardly and across the top of the annular chamber of the drum and extending downwardly upon the inner and outer cylindrical walls of the drum.

2. A heating unit comprising a furnace housing chamber having an air intake in the lower portion thereof, a furnace unit in said chamber, said unit having a lower fire box portion and an upper drum portion, the latter terminating at its top in proximity to the top of the housing chamber but in predetermined spaced relation thereto and itself having spaced double cylindrical walls providing an annular chamber closed at its top but open throughout the extent of its bottom to communicate with the fire box portion of the unit, the central chamber defined by the inner cylindrical wall of the drum being closed at its lower end but open at its top, radial fin members provided on the upper portion of the drum, said fin members extending above the top of the drum with their top edge portions closely contiguous to the top of the housing chamber and thence downwardly within the central chamber of the drum and also circumferentially of the drum, a hollow heat collecting ring surrounding the lower portion of the drum, the top wall of said ring being in direct engagement with the adjacent outer end portions of said fin members, radial tubular passageways communicably connecting the central chamber of the drum with said heat collecting ring, and a hot air distributor located externally of the furnace housing chamber and having a tubular communicable connection with said heat collecting ring.

CLARENCE L. ARNOLD.